United States Patent

[11] 3,634,114

[72] Inventor Glenn H. Lufcy
Tiffin, Ohio
[21] Appl. No. 793,895
[22] Filed Jan. 24, 1969
[45] Patented Jan. 11, 1972
[73] Assignee Basic Incorporated
Cleveland, Ohio

[54] COMPOSITION AND METHOD FOR THE PRODUCTION OF CERAMICALLY BONDED BASIC REFRACTORIES
18 Claims, No Drawings

[52] U.S. Cl..................................................... 106/58,
106/63
[51] Int. Cl........................................................C04b 35/04,
C04b 35/06

[50] Field of Search............................................ 106/56, 58,
63, 280, 281, 284

[56] References Cited
UNITED STATES PATENTS
3,222,196 12/1965 Davies et al. ................. 106/58
3,256,104 6/1966 Weaver ........................ 106/58

*Primary Examiner*—James E. Poer
*Attorney*—Oberlin, Maky, Donnelly & Renner

ABSTRACT: In the production of ceramically bonded basic refractories, basic refractory particles are bonded together with a temporary binder. The temporary binder includes a substantially completely neutralized pitch, which may be a tall oil pitch or a fatty acid pitch, and may also include cylinder lube stock and/or an asphalt binder oil.

COMPOSITION AND METHOD FOR THE PRODUCTION OF CERAMICALLY BONDED BASIC REFRACTORIES

This invention relates generally as indicated to a composition and method for the production of ceramically bonded basic refractories, and more particularly relates to such a composition and method in which a novel temporary binder is used.

It is, of course, well known that ceramically bonded basic refractories possess much greater strength, particularly at elevated temperatures, than unburned refractories because of the ceramic bond which has been formed during the firing process. The desirability of such refractories for use in the large oxygen steelmaking furnaces is quite apparent and there is thus a demand in the steelmaking industry for ceramically bonded basic refractories of superior strength and satisfactory resistance to hydration.

In the manufacture of ceramically bonded refractories, the refractory particles must be bonded together temporarily to enable the particles to be formed into the desired refractory shape. Because of the tendency of basic refractory materials such as dead-burned dolomite and dead-burned magnesia to hydrate, nonaqueous binders must be used. Examples of such nonaqueous binders which have been previously used include tall oil (U.S. Pat. No. 2,501,336), bituminous, petroleum and fatty acid pitches and mixtures of such materials (U.S. Pat. No. 3,222,196).

Such binders, however, have characteristics which make them unsatisfactory as a universally useful bond for use with all refractory mixes. For example, bituminous pitches have a relatively high fixed carbon content, which is quite difficult to burn out in the firing process to produce a ceramically bonded brick. Petroleum pitches likewise have sufficient quantities of fixed carbon to cause difficulty unless care is taken in the firing process. Fatty acid and tall oil pitches have substantially lower quantities of fixed carbon, but these pitches can be neutralized by basic oxides such as magnesium oxide and calcium oxide to produce metallic soaps and water which are undesirable and must be avoided.

It is accordingly a principal object of the present invention to provide a composition and method for producing ceramically bonded basic refractories utilizing a nonaqueous temporary binder which has a relatively low fixed carbon content.

It is yet another object of this invention to provide such a composition and method utilizing a temporary binder which is not susceptible to the formation of metallic soaps and water.

A further object of the present invention is the provision of such a composition and method utilizing a temporary binder which has sufficient tack and strength to effectively bind the refractory particles into an integral shape but which can also relatively easily be substantially completely removed in the firing process.

Other objects, features and advantages of this invention will become clear to those skilled in the art after a reading of the following more detailed description.

These and other objects are achieved by the present invention in which a composition and method for the production of ceramically bonded basic refractories are provided in which a temporary binder comprising a substantially completely neutralized pitch selected from the group consisting of tall oil pitches and fatty acid pitches is used. As will be explained more fully by the description which follows, the binder may also include cylinder lubricating stock and an asphalt binder oil.

In the present invention, various basic refractory compositions can be used, including dolomite, synthetic dolomite, limestone, magnesite, periclase, magnesia and mixtures thereof. Illustrative examples of such basic refractories include those of the following chemical compositions:

| Composition No. 1 | |
| --- | --- |
| MgO | 95.2% |
| CaO | 2.7% |
| $SiO_2$ | 1.1% |
| $Fe_2O_3$ | 0.5% |
| $Al_2O_3$ | 0.5% |
| Composition No. 2 | |
| MgO | 41.4% |
| CaO | 57.4% |
| $SiO_2$ | 0.4% |
| $Fe_2O_3$ | 0.2% |
| $Al_2O_3$ | 0.1% |
| Composition No. 3 | |
| MgO | 60.1% |
| CaO | 38.7% |
| $SiO_2$ | 0.7% |
| $Fe_2O_3$ | 0.2% |
| $Al_2O_3$ | 0.3% |

As noted above, the binder for the basic refractory particles may comprise the indicated substantially completely neutralized pitch alone or such pitch in combination with cylinder lube stock or an asphalt binder oil. It has been found that the neutralized pitch has a sufficiently high melting point to avoid excessive thermoplasticity which is caused by the formation of metallic soaps when acidic pitch is used. The use of neutralized pitch also minimizes the formation of water. Moreover, the neutralized pitch has a relatively low fixed carbon content and thus avoids the aforenoted problems which occur when bituminous and petroleum pitches are used.

The neutralized pitch may be formed from a tall oil pitch or a fatty acid pitch as will be described. Tall oil is defined by the Encyclopedia of Chemical Technology as a natural mixture of fatty acids related to oleic acid and rosin acids related to abietic acid, together with nonacidic bodies, and is obtained by acidifying the black liquor skimmings of the alkaline paper pulp industry. The various components of tall oil can be separated by distillation, and the still residue is commonly known as tall oil pitch. Some pitches normally contain from about 13 to about 30 percent rosin acids and from about 40 to about 70 percent fatty acids. The acid number of such pitches normally varies between about 20 to about 75.

Fatty acid pitches are, of course, residual materials obtained in the fractional distillation of various animal and vegetable materials such as lard, tallow, palm oil and other vegetable oils. Typically, fatty acid pitches will contain from about 10 to about 20 percent of free fatty acids and will have an acid number ranging from about 20 to about 40.

The tall oil or fatty acid pitch is substantially completely neutralized by reaction with a suitable base such as sodium hydroxide, and the water which is formed during neutralization is subsequently removed by vaporization. The quantity of basic material which must be used will, of course, depend upon the acid content of the pinch. In one example, using a tall oil pitch having a rosin acid content of about 16 percent and an acid number in the range of 40 to 70, substantially complete neutralization has been obtained by reacting approximately 7 weight percent calcium oxide with the tall oil pitch and finishing the neutralization by further reacting the resulting product with about 3.5 weight percent caustic soda (sodium hydroxide).

Since caustic soda would act as a fluxing agent during the firing process, only a small quantity should be used. For this reason, it is highly desirable to use a neutralizing agent such as calcium oxide, magnesia or other alkaline earth oxides, but the quantity of this material which can be suitably used is somewhat limited since an excessively viscous mass will be produced if more than about the indicated 7 percent by weight, based on the weight of the tall oil pitch, is used. The combination of such neutralizing agents, however, can be easily used and produces a neutralized pitch having satisfactory properties and characteristics. The resulting neutralized tall oil pitch will thus have a maximum acid number of about 5 and will also have a softening temperature which is in the range of about 175 to about 225° F. A typical softening temperature is approximately 200° F.

The neutralized pitch may also include a small quantity, i.e., a maximum of approximately 2 percent by weight, based on the weight of the pitch, of a polymerizing agent such as sulfur. It has also been found that sulfur improves compatibility between neutralized tall oil pitches and coal tar pitches and thus the inclusion of a small quantity of such material is beneficial since, in some cases, it may be desirable to admix the binder of this invention with a small quantity of coal tar pitch.

The substantially completely neutralized pitch can be produced as follows. One hundred parts by weight of tall oil pitch are placed in a tank and heated with agitation to about 290° to about 330° F. Approximately 7 parts by weight of calcium oxide are then added slowly over a period of about 4 to 5 hours to minimize foaming while the temperature is maintained within the range of 290° to 330° F. About 3.5 parts by weight of caustic soda are then slowly added to bring the acid number down to 5 or less. If sulfur is to be included, about 2 to about 3 parts by weight of sulfur are then added slowly to the mixture and the temperature is held within the range of 290° to 330° F. for about 2 hours after addition of the sulfur is completed.

Only a small quantity of the temporary binder will be used, normally from about 2½ to about 3½ percent by weight, based on the total weight of the refractory particles. Since the binder must be removed in the firing process which follows, the quantity of the binder need only be sufficient to enable the production of an integral refractory shape. Particularly good results in the present invention have been achieved when the quantity of binder is retained within the preferred range of about 2¾ to about 3¼ percent by weight.

In the neutralized pitch, particularly the tall oil pitch, there is still a significant hydrogen content, which, upon pyrolysis, contributes to the production of water which can, of course, hydrate basic refractory particles. The neutralized tall oil pitch is also quite tacky which makes it somewhat difficult to blend uniformly with the basic refractory particles. In the present invention, it has been found that the neutralized pitch can be improved so as to have greater protection against hydration, to be more easily blendable and to be a more satisfactory binder if it is used in combination with cylinder lube stock and/or an asphalt binder oil. From approximately 10 to about 90 weight percent, based on the total weight of the binder, of the cylinder lube stock or asphalt binder oil can be used, with the preferred range being approximately 25 to 75 weight percent. Particularly good results have been obtained when a 50—50 weight percent mixture is used.

Cylinder lube stock is, of course, a distillation product of crude oil between fuel oil and asphalt. Typically, it has a viscosity range of about 80 to 90 Saybolt Universal Seconds at 210° F.

The asphalt binder oil which is used in the present invention is to be distinguished from asphalt pitches since the binder oil contains asphalt rather than a pitch and has less residual carbon and also contains from about 5 to about 60 percent by weight of cylinder lube (lubricating) stock. The binder oil is also preferably airblown, which is believed to oxidize and polymerize the asphalt and remove the volatiles therefrom. The same results can also be achieved, however, with a catalyst such as ferric sulfate.

A preferred composition of the asphalt binder oil will have a ring and ball melting point temperature within the range of from about 120° to about 153° F. and a viscosity of about 2,000 Saybolt Furol Seconds at approximately 300° F. As noted above, the binder oil has a relatively low fixed carbon content, viz, a maximum Conradson carbon content of about 25 weight percent (ASTM–D189–58).

When the temporary binder of this invention thus consists of the mixture of neutralized pitch and asphalt binder oil, the quantity used in the production of the ceramically bonded basic refractories will be the same as that set forth previously, viz, a range of from about 2½ to about 3½ weight percent, about 2¾ to about 3¼ weight percent being preferred.

In the production of basic refractory articles according to the present invention, basic refractory particles such as the aforenoted dead-burned dolomite, dead-burned magnesia and mixtures thereof are admixed with sufficient binder to bind the particles together, and after a substantially uniform blend of binder and particles is obtained, the admixture is formed into the desired refractory shape. In a preferred form of the method, the basic refractory particles are preheated to a temperature of about 265° to about 300° F. prior to admixing with the binder. When the binder is the combination of neutralized pitch and asphalt binder oil, the ingredients of the binder are preblended, preferably at a temperature of from about 300° to 350° F., to obtain a substantially uniform blend prior to admixing with the basic refractory particles.

After the basic refractory particles have been thoroughly admixed with the binder, which normally requires a mixing time of from about 10 to about 15 minutes, the admixture may be formed into the desired refractory shapes in a hydraulic or mechanical press capable of exerting a pressure of from about 5 to about 7 tons per square inch.

The refractory shapes may be tempered prior to firing as is known in the industry. The temperature of tempering is preferably within the range of from about 450° to about 575° F., with 550° F. being the preferred temperature. The tempering will normally take from about 10 to about 24 hours, 16 hours being the preferred time at 550° F.

After tempering, the refractory shapes are fired at a higher temperature sufficient to obtain a ceramic bond among the basic refractory particles. The maximum maturing temperature of such firing is normally within the range of from about 2,650° F. to about 3,000° F. The entire firing cycle requires from about 48 to about 60 hours. Such firing may take place in commercially available kilns such as periodic bell-type kilns, tunnel kilns and ordinary periodic kilns. During firing, an excess of air is maintained in the kiln to provide an oxidizing atmosphere therein until residual carbon has been completely removed by oxidation. Natural gas may be used as the fuel for the kiln.

The invention will be better understood by reference to the following specific but nonlimiting examples.

EXAMPLE 1

One hundred pound batches of a dead-burned magnesia of the following composition were preheated to 265° F.

| Chemical Composition | |
|---|---|
| MgO | 95.2% |
| CaO | 2.7% |
| $SiO_2$ | 1.1% |
| $Al_2O_3$ | 0.5% |
| $Fe_2O_3$ | 0.5% |
| Screen Sizing | |
| —¾+3 | 20 Weight Percent |
| —3+6 | 20 Weight Percent |
| —6+12 | 15 Weight Percent |
| —12+20 | 5 Weight Percent |
| —20 | 5 Weight Percent |
| BMF* | 35 Weight Percent |

*Ball Milled Fines (all screen sizes are Tyler Sieve Sizes)

After preheating, approximately 3.25 weight percent, based on the total weight of the refractory particles, of the previously described substantially completely neutralized tall oil pitch binder (including approximately 2 percent sulfur) having an acid number of 5, which had been preheated to approximately 300° F. to melt the same, was admixed with the refractory particles for approximately 10 minutes to provide a substantially uniformly blended admixture. The temperature of the mixed batch was approximately 265° F. and the batches were then pressed at 5 tons per square inch in a hydraulic press to produce refractory bricks 9×4½×3 inches in dimension. The bricks were set on a kiln car approximately eight high on an edge with finger spacing between adjacent bricks. The bricks were then fired at a temperature of 2,650° F. for a period of about 10 hours, after which they were cooled to approximately 500° F. in the kiln and were thereafter removed and permitted to cool to ambient temperature in the normal atmosphere.

The results of the foregoing example are shown in table I which follows.

TABLE I

| Brick No. | Length, in. | Width, in. | Thickness in. | Wt., lbs. | Break load, lbs. | Mod. of R., p.s.i.A | Dry wt., lbs. | Sus. wt., lbs. | Sat. wt., lbs. | App. porosity, percent B | Bulk density, #/ft.³ B |
|---|---|---|---|---|---|---|---|---|---|---|---|
| 1 | 8.97 | 4.49 | 3.08 | 12.60 | 7,500 | 1,850 | 6.201 | 4.749 | 6.526 | 18.3 | 177 |
| 2 | 8.96 | 4.48 | 3.08 | 12.57 | 5,875 | 1,450 | 5.640 | 4.311 | 5.930 | 17.9 | 177 |
| 3 | 8.97 | 4.50 | 3.09 | 12.61 | 3,150 | 770 | 6.058 | 4.628 | 6.363 | 17.6 | 170 |
| 4 | 8.97 | 4.48 | 3.08 | 12.60 | 7,000 | 1,730 | 5.175 | 3.951 | 5.430 | 17.2 | 178 |
| 5 | 8.98 | 4.50 | 3.07 | 12.60 | 4,250 | 1,050 | 5.889 | 4.483 | 6.170 | 16.7 | 178 |

A Calculated per ASTM C133-55 (1961).
B Calculated per ASTM C20-46 (1961) with corrections made for the specific gravity of kerosene used.

TABLE II

| Brick No. | Length, in. | Width, in. | Thickness in. | Wt., lbs. | Break load, lbs. | Mod. of R., p.s.i.A | Dry wt., lbs. | Sus. wt., lbs. | Sat. wt., lbs. | App. porosity, percent B | Bulk density, #/ft.³ B |
|---|---|---|---|---|---|---|---|---|---|---|---|
| 1 | 8.97 | 4.49 | 3.07 | 12.60 | 7,875 | 1,950 | 4.879 | 3.732 | 5.124 | 17.9 | 178 |
| 2 | 8.97 | 4.49 | 3.07 | 12.60 | 6,850 | 1,700 | 5.221 | 3.991 | 5.500 | 18.5 | 176 |
| 3 | 8.97 | 4.49 | 3.07 | 12.60 | 5,850 | 1,450 | 5.329 | 4.078 | 5.607 | 18.2 | 178 |
| 4 | 8.98 | 4.48 | 3.07 | 12.60 | 6,750 | 1,680 | 5.720 | 4.364 | 6.011 | 17.7 | 177 |
| 5 | 8.98 | 4.48 | 3.07 | 12.58 | 6,050 | 1,500 | 6.001 | 4.589 | 6.325 | 18.7 | 176 |

A Calculated per ASTM C133-55 (1961).
B Calculated per ASTM C20-46 (1961) with corrections made for the specific gravity of kerosene used.

EXAMPLE 2

Using the procedure of example 1, 100 lb. batches of the dead-burned magnesia were admixed with 3.25 weight percent of a binder consisting of a mixture of the substantially completely neutralized tall oil pitch of example 1 mixed with the aforedescribed asphalt binder oil in a 50—50 weight percent ratio.

The results of this example are shown in table II.

EXAMPLE 3

In this example, a dead-burned magnesia of the following chemical composition was used:

| | |
|---|---|
| MgO | 93.92% |
| CaO | 3.32% |
| SiO₂ | 1.23% |
| Al₂O₃ | 0.53% |
| Fe₂O₃ | 0.63% |
| LOI | 0.37% |

The screen size distribution of the dead-burned magnesia was:

| | |
|---|---|
| −⅜+3 | 20 Weight Percent |
| −3+6 | 20 Weight Percent |
| −6+12 | 15 Weight Percent |
| −12+20 | 5 Weight Percent |
| −20 | 5 Weight Percent |
| BMF* | 35 Weight Percent |

*Ball Milled Fines

The procedure followed for formation of the refractory shapes was substantially the same as that used in examples 1 and 2. The dead-burned magnesia grains were preheated to a temperature of approximately 265° F. and admixed with a binder consisting of a 50—50 weight percent mixture of the aforedescribed substantially completely neutralized tall oil pitch and cylinder lube stock which had been preblended at a temperature of approximately 325° F. to produce a substantially uniform blend of the components. After admixing with the preheated basic refractory particles, the particles and binder were mixed in a Muller mixer for approximately 13 minutes, at the end of which the temperature of the admixture was approximately 250° F.

After mixing the admixture was formed into refractory bricks in a mechanical toggle press, the bricks being approximately 27×(6–5)×3 inches in dimension. The bricks were then set eight high with finger spacing in the usual manner on a kiln car and fired at the following firing schedule.

| Temperature °F. | Heating Rate | Time |
|---|---|---|
| Room Temp. 1350 | 100°/hr. | 13 hr. |
| 1,350–2,350 | 50°/hr. | 20 hr. |
| 2,350–2,650 | 30°/hr. | 10 hr. |
| 2,650 Soak | — | 10 hr. |

After the 10-hour soaking at 2,650° F., the kiln was slowly cooled to a temperature of about 500° F. after which the bricks were removed and permitted to cool to room temperature in the normal atmosphere.

The fired brick had an average bulk density of 180 lb./cu. ft., an apparent porosity of 16.5 percent and a cold modulus of rupture of 2,710 pounds/sq. in.

EXAMPLE 4

A dead-burned magnesia having the same approximate chemical composition and size distribution of example 3 was admixed with 3.25 weight percent of a 50—50 weight percent mixture of the aforedescribed neutralized tall oil pitch and cylinder lube stock. The magnesia particles and binder were preheated, blended, and pressed into brick as in the preceding examples. In this example, certain of the brick were tempered following pressing, the temperature being at a temperature of about 550° F. for approximately 16 hours. All of the brick, whether tempered or not, were then fired in a kiln as in example 3. The average properties of the tempered and untempered brick after firing were as follows.

| | Tempered | Untempered |
|---|---|---|
| Bulk Density lb./ft.³ | 180 | 180 |
| M of R lb./in.² | 1,215 | 1,925 |
| Apparent Porosity % | 17.1 | 17.3 |

EXAMPLE 5

In this example, a mixture of 65 weight percent dead-burned dolomite and 35 weight percent dead-burned magnesia having the following composition and size distribution was used.

| | |
|---|---|
| MgO | 41.55% |
| CaO | 56.75% |
| SiO₂ | 0.8% |
| Al₂O₃ | 0.21% |
| Fe₂O₃ | 0.11% |
| LOI | 0.80% |
| −⅜+3 | 20 Weight Percent |
| −3+6 | 20 Weight Percent |
| −6+12 | 15 Weight Percent |
| −12+20 | 5 Weight Percent |
| −20 | 5 Weight Percent |
| Balled milled fines | 35 Weight Percent |

The dead-burned grains were preheated as in the previous examples and were then admixed with about 3.25 weight percent of a 50—50 weight percent mixture of the previously described neutralized tall oil pitch and asphalt binder oil containing approximately 10 weight percent cylinder lube stock which was preblended as in the foregoing examples. After thoroughly admixing, the refractory particles-binder admixture was pressed into 9×4½×3 inch bricks on a hydraulic press at a pressure of 6 tons/sq. in. The bricks were thereafter tempered as in the preceding example and fired at temperatures of 2,650°, 2,700°, 2,750°, and 2,800° F. for approximately hours.

The properties of these bricks are shown in the following table III.

TABLE III

| | Firing Temp. °F. | | | |
|---|---|---|---|---|
| | 2,650 | 2,700 | 2,750 | 2,800 |
| Tempered Bricks (whole) | | | | |
| Bulk Density lb./ft.³ | 183 | 186 | 184 | 185 |
| | 186 | 182 | 184 | 183 |
| | 186 | 182 | 184 | 182 |
| Burned Bricks (whole) | | | | |
| Bulk Density lb./ft.³ | 183 | 184 | 186 | 188 |
| | 183 | 182 | 188 | 186 |
| | 184 | 183 | 187 | 185 |
| Burned Bricks (whole) | | | | |
| Mod of R p.s.i. at room temperature | 2,140 | 1,490 | 2,210 | 1,390 |
| | 2,160 | 2,120 | 1,930 | 1,290 |
| | 1,350 | 1,080 | 2,190 | 1,170 |
| Burned Brick (segments) Bulk Density lb./ft.³ | 185 | 186 | 187 | 187 |
| | 185 | 183 | 187 | 184 |
| | 185 | 184 | 188 | 184 |
| Apparent Porosity % | 14.1 | 12.6 | 12.6 | 13.0 |
| | 13.8 | 14.1 | 13.2 | 12.7 |
| | 13.7 | 13.7 | 12.7 | 12.7 |

The freshly pressed brick prepared in the preceding examples had mechanical strengths equal to or exceeding the strength of freshly pressed chemically bonded brick such as those using magnesium sulfate as a binder or those made with the nonaqueous binders of U.S. Pat. No. 2,501,336 or 3,222,196. Also, during the tempering and firing of the brick in the preceding examples, there was no evidence of hydration. The fired brick from such examples, upon examination after breaking, were found to be free of any carbon residue from the binder.

Other modes of applying the principle of the invention may be employed, change being made as regards the details described, provided the features stated in any of the following claims, or the equivalent of such, be employed.

I therefore particularly point out and distinctly claim as my invention:

1. A composition for making basic ceramically bonded refractories consisting essentially of basic refractory particles and sufficient binder to bind said particles together, said binder comprising a substantially completely neutralized substantially anhydrous pitch selected from the group consisting of tall oil pitches and fatty acid pitches, and from about 10 to about 90 weight percent, based on the total weight of said binder, of an asphalt binder oil having a ring and ball melting point temperature within the range of from about 126° to about 153° F. and a maximum Conradson carbon content of about 25 weight percent.

2. The composition of claim 1 in which said basic refractory particles are selected from the group consisting of dead-burned dolomite, dead-burned magnesia and mixtures thereof.

3. The composition of claim 1 in which from about 2½ to about 3½ weight percent, based on the weight of said refractory particles, of said binder is used.

4. A composition for making basic ceramically bonded refractories consisting essentially of basic refractory particles and sufficient binder to bind said particles together, said binder comprising a substantially completely neutralized substantially anhydrous pitch selected from the group consisting of tall oil pitches and fatty acid pitches, and from about 10 to about 90 weight percent, based on the total weight of said binder, of cylinder lube stock.

5. The composition of claim 4 in which said binder is a 50—50 weight percent mixture of cylinder lube stock and neutralized pitch.

6. A refractory composition for the production of basic ceramically bonded refractories consisting essentially of basic refractory particles selected from the group consisting of dead-burned dolomite, dead-burned magnesia and mixtures thereof, and sufficient binder to bind said particles together, said binder comprising a substantially completely neutralized substantially anhydrous tall oil pitch having a maximum acid number of about 5 and a softening temperature within the range of from about 175° to about 225° F.

7. The composition of claim 6 in which said neutralized tall oil pitch includes about 3.5 weight percent caustic soda and about 7 weight percent lime, based on the weight of said tall oil pitch.

8. The composition of claim 7 in which said neutralized tall oil pitch includes a maximum of about 2 weight percent of sulfur, based on the weight of said tall oil pitch.

9. A composition for making basic ceramically bonded refractories consisting essentially of basic refractory particles and sufficient binder to bind said particles together, said binder comprising a substantially completely neutralized substantially anhydrous pitch selected from the group consisting of tall oil pitches and fatty acid pitches, and from about 25 to about 75 weight percent, based on the total weight of said binder, of an asphalt binder oil having a ring and ball melting point temperature within the range of from about 126° to about 153° F. and a maximum Conradson carbon content of about 25 weight percent.

10. A composition for making basic ceramically bonded refractories consisting essentially of basic refractory particles and sufficient binder to bind said particles together, said binder comprising a substantially completely neutralized substantially anhydrous pitch selected from the group consisting of tall oil pitches and fatty acid pitches, and from about 25 to about 75 weight percent, based on the total weight of said binder, of cylinder lube stock.

11. The composition of claim 1 in which said binder is a 50—50 weight percent mixture of asphalt binder oil and neutralized pitch.

12. A composition for making basic ceramically bonded refractories consisting essentially of basic refractory particles and sufficient binder to bind said particles together, said binder comprising a substantially completely neutralized substantially anhydrous pitch selected from the group consisting of tall oil pitches and fatty acid pitches, and from about 25 to about 75 weight percent, based on the total weight of said binder, of asphalt binder oil, said asphalt binder oil comprising asphalt and about 5 to about 60 weight percent cylinder lube stock, based on the total weight of the binder oil, the binder oil having a ring and ball melting point temperature within the range of from about 126° to about 153° F. and a maximum Conradson carbon content of about 25 weight percent.

13. The composition of claim 12 wherein said asphalt binder oil is airblown.

14. The composition of claim 6 in which said binder includes from about 10 to about 90 weight percent, based on the total weight of said binder, of an asphalt binder oil having a ring and ball melting point temperature within the range of from about 126° to about 153° F. and a maximum Conradson carbon content of about 25 weight percent.

15. The composition of claim 6 in which said binder includes from about 25 to about 75 weight percent, based on the total weight of said binder, of an asphalt binder oil having a ring and ball melting point temperature within the range of from about 126° to about 153° F. and a maximum content Conradson carbon content of about 25 weight percent.

16. The composition of claim 15 in which said binder oil comprises asphalt and about 5 to about 60 weight percent, based on the total weight of the binder oil, of cylinder lube stock.

17. The composition of claim 15 in which said binder oil is airblown.

18. The composition of claim 6 in which said binder includes from about 25 to about 75 weight percent, based on the total weight of said binder, of cylinder lube stock.

* * * * *